(12) United States Patent
Fujiwara et al.

(10) Patent No.: US 10,890,249 B2
(45) Date of Patent: Jan. 12, 2021

(54) SHIFT CONTROL DEVICE FOR VEHICLE

(71) Applicant: TOYOTA JIDOSHA KABUSHIKI KAISHA, Toyota (JP)

(72) Inventors: Hiroya Fujiwara, Nagoya (JP); Shun Sato, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/662,145

(22) Filed: Oct. 24, 2019

(65) Prior Publication Data
US 2020/0132188 A1 Apr. 30, 2020

(30) Foreign Application Priority Data

Oct. 30, 2018 (JP) ................................. 2018-204440

(51) Int. Cl.
| F16H 61/02 | (2006.01) |
| F16H 61/08 | (2006.01) |
| F16H 61/10 | (2006.01) |
| F16H 59/40 | (2006.01) |
| F16H 59/60 | (2006.01) |
| F16H 59/54 | (2006.01) |
| F16H 59/44 | (2006.01) |

(52) U.S. Cl.
CPC ............. *F16H 61/08* (2013.01); *F16H 59/44* (2013.01); *F16H 59/54* (2013.01); *F16H 2306/20* (2013.01)

(58) Field of Classification Search
CPC .......... F16H 61/10; F16H 59/48; F16H 59/54; F16H 59/66; F16H 103/12; F16H 2061/0227; F16H 2306/20
See application file for complete search history.

(56) References Cited

U.S. PATENT DOCUMENTS

| 7,014,592 | B2* | 3/2006 | Wiethe | F16H 61/21 477/120 |
| 2008/0129109 | A1* | 6/2008 | Schuh | F16D 63/006 303/9.61 |
| 2009/0093936 | A1* | 4/2009 | Lindgren | F16H 61/0213 701/55 |
| 2013/0209968 | A1* | 8/2013 | Miller | G09B 9/052 434/65 |

(Continued)

FOREIGN PATENT DOCUMENTS

JP 2005-299879 A 10/2005

*Primary Examiner* — Tisha D Lewis
(74) *Attorney, Agent, or Firm* — Oliff PLC (57) ABSTRACT

A shift control device for a vehicle, includes: a minimum vehicle speed calculator that, when it is determined that a vehicle on traveling needs to decelerate before the vehicle arrives at a forward predetermined point, calculates a minimum vehicle speed using the periphery information; a shift position determination unit that determines a target shift position; and a downshift controller that, when the minimum vehicle speed is calculated, commences a downshift from a current shift position to the target shift position. Further, the downshift controller implements first control of performing multiple downshifts from the current shift position to the target shift position such that shift timing is provided at regular intervals, or second control of performing multiple downshifts such that rotational speeds of the engine after the respective downshifts become equal to each other.

4 Claims, 9 Drawing Sheets

(56) References Cited

U.S. PATENT DOCUMENTS

2016/0109021 A1\* 4/2016 Kim .................. B60W 50/10
　　　　　　　　　　　　　　　　　　　　701/22
2017/0021825 A1\* 1/2017 Burt .................. B60W 20/12

\* cited by examiner

SHIFT CONTROL DEVICE FOR VEHICLE

CROSS-REFERENCE TO RELATED APPLICATION(S)

The present application claims priority to and incorporates by reference the entire contents of Japanese Patent Application No. 2018-204440 filed in Japan on Oct. 30, 2018.

BACKGROUND

The present disclosure relates to a shift control device for a vehicle.

Japanese Laid-open Patent Publication No. 2005-299879 discloses a control device for an automatic transmission. When the control device detects brake-on before a vehicle enters a curve, then the control device detects a deceleration attained by the application of a brake, selects a target shift map in accordance with the deceleration, sets a target shift position based on the target shift map and a vehicle speed, and performs downshift to the target shift position.

SUMMARY

There is a need for providing a shift control device for a vehicle, the shift control device being capable of suppressing occurrence of a busy shift due to a downshift with deceleration.

According to an embodiment, a shift control device for a vehicle including an engine and an automatic transmission, includes: a minimum vehicle speed calculator that, when it is determined that a vehicle on traveling needs to decelerate before the vehicle arrives at a forward predetermined point based on periphery information, which is information on a periphery of the vehicle, calculates a minimum vehicle speed, which is a vehicle speed after the deceleration, using the periphery information; a shift position determination unit that determines a target shift position, which is a shift position to be attained after the deceleration in accordance with the minimum vehicle speed; and a downshift controller that, when the minimum vehicle speed is calculated, commences a downshift from a current shift position to the target shift position before a detection of an operation of depressing a brake pedal by a driver. Further, the downshift controller implements first control of performing multiple downshifts from the current shift position to the target shift position such that shift timing is provided at regular intervals, or second control of performing multiple downshifts such that rotational speeds of the engine after the respective downshifts become equal to each other, and each interval of the downshift is set so as not to become equal to or less than a predetermined value.

DETAILED DESCRIPTION

In the related art, according to the configuration disclosed in Japanese Laid-open Patent Publication No. 2005-299879, the control device commences the control with brake-on as a trigger. Consequently, a deceleration time is reduced depending on the vehicle speed and brake deceleration attained after deceleration. When the downshift to the target shift position is performed within the deceleration time, a so-called "busy shift" may occur in which the downshift is frequently repeated in a short time.

With reference to the drawings, hereinafter, a detailed description will be given of a shift control device for a vehicle according to an embodiment of the present disclosure. In all the drawings illustrating the following embodiment, identical or corresponding portions are denoted with identical reference signs. In addition, the present disclosure is not limited to the embodiment described below.

Figure 1:
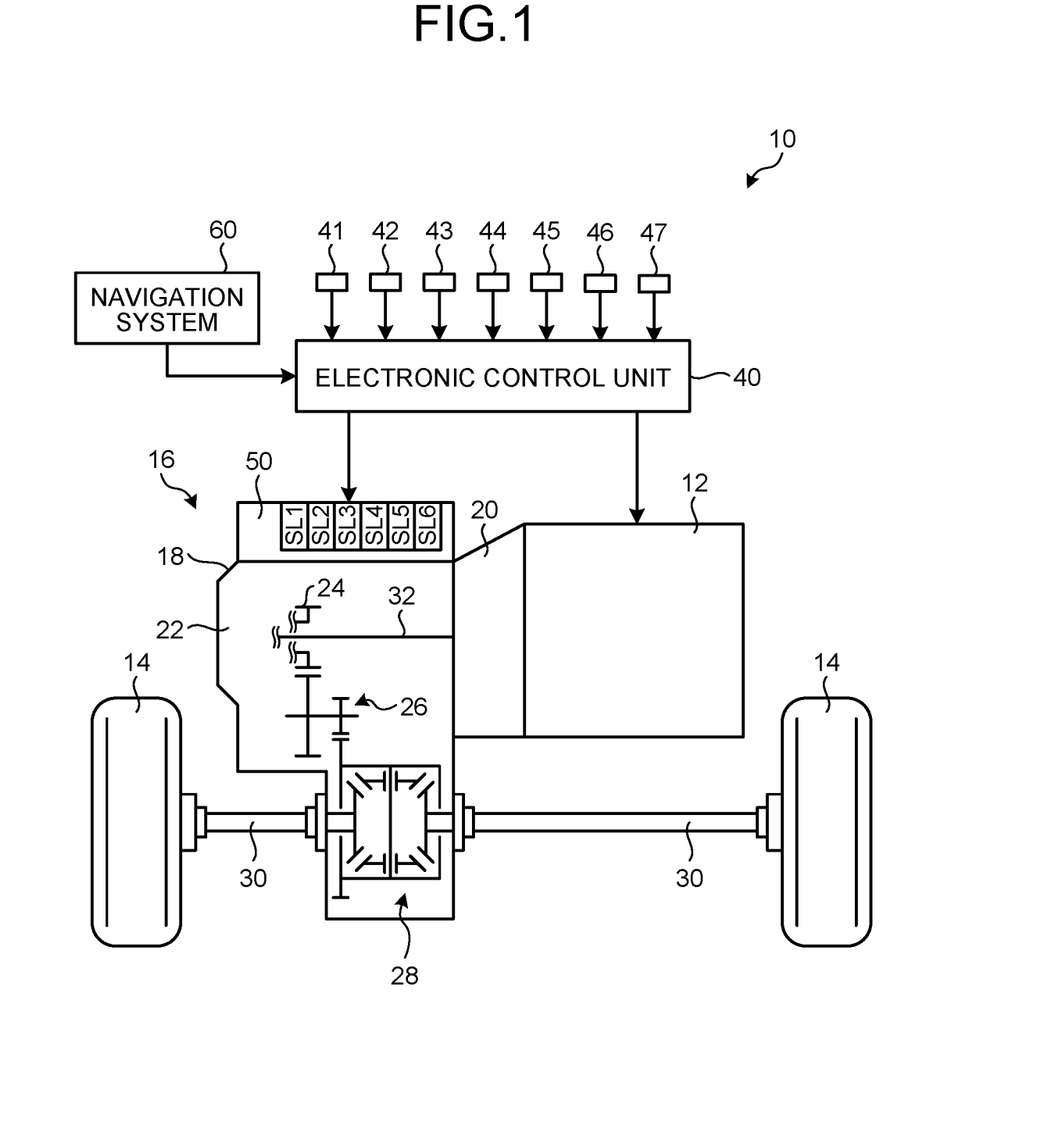
FIG. 1 is a skeleton diagram schematically illustrating a vehicle to which an embodiment is applied.

FIG. 1 is a skeleton diagram schematically illustrating a vehicle to which the embodiment is applied. A vehicle 10 includes an engine 12, driving wheels 14, and a power transmission device 16 disposed on a power transmission path between the engine 12 and the driving wheels 14. The power transmission device 16 includes a casing 18 mounted to a vehicle body, a torque converter 20, an automatic transmission 22, a deceleration gear mechanism 26 coupled to an output gear 24 of the automatic transmission 22, a differential gear 28 coupled to the deceleration gear mechanism 26, and drive shafts 30. The torque converter 20, the automatic transmission 22, the deceleration gear mechanism 26, the differential gear 28, and the drive shafts 30 are housed in the casing 18. Power output from the engine 12 is transmitted to the torque converter 20, the automatic transmission 22, the deceleration gear mechanism 26, the differential gear 28, and the drive shafts 30 in that order, and then is transmitted to the driving wheels 14. The vehicle 10 also includes an electronic control unit (hereinafter, referred to as an "ECU") 40 serving as a controller that controls the vehicle 10.

The engine 12 is a driving force source for traveling, and examples thereof may include known internal combustion engines such as gasoline engines and diesel engines. The engine 12 is controlled by the ECU 40 as to its operational states such as a volume of intake air, an amount of fuel, and ignition timing. A configuration of the ECU 40 will be described in detail later.

The torque converter 20 is a fluid power transmission device disposed on a power transmission path between the engine 12 and the automatic transmission 22. The torque converter 20 is disposed coaxially with a transmission input shaft 32 serving as an input rotary member of the automatic transmission 22.

The automatic transmission 22 is a stepped automatic transmission constituting a part of the power transmission path between the engine 12 and the driving wheels 14. For example, the automatic transmission 22 may be a planetary gear-type multistep transmission including a plurality of planetary gear devices and a plurality of engagement devices. The automatic transmission 22, which is a multistep transmission, selectively establishes gear steps (shift positions) including eight forward gear steps, that is, first to eighth gear steps and a reverse gear step. The operating states of the engagement devices are switched in such a manner that the torque capacities of the engagement devices are changed in accordance with engagement pressures (hydraulic pressures) respectively output from, for example, solenoid valves SL1 to SL6 of a hydraulic control circuit 50. In other words, the automatic transmission 22, which is a multistep transmission, selectively establishes a plurality of shift positions different in change gear ratio from one another, in such a manner that the ECU 40 selectively engages any of the engagement devices in accordance with, for example, an accelerator operation by a driver, and a vehicle speed.

The ECU 40 includes, for example, a microcomputer including a central processing unit (CPU), a random access memory (RAM), a read only memory ROM, an input/output interface and the like. The ECU 40 receives signals from, for example, various sensors in the vehicle 10. The various sensors include a vehicle speed sensor 41, an engine speed sensor 42, an input rotational speed sensor 43, an output rotational speed sensor 44, an accelerator pedal opening sensor 45, a throttle opening sensor 46, a brake switch 47, and the like. The vehicle speed sensor 41 detects a vehicle speed. The engine speed sensor 42 detects a rotational speed of the engine 12 (i.e., an engine speed). The input rotational speed sensor 43 detects a rotational speed of the transmission input shaft (i.e., an input rotational speed). The output rotational speed sensor 44 detects a rotational speed of the output gear 24 (i.e., an output rotational speed). The accelerator pedal opening sensor 45 detects an accelerator pedal opening indicating an accelerator pedal depression amount. The throttle opening sensor 46 detects a throttle opening that is an opening of an electronic throttle valve. The brake switch 47 detects that a brake pedal for applying a wheel brake is operated by the driver.

The ECU 40 controls the vehicle 10 by implementing, for example, shift control of the automatic transmission 22 and hydraulic-pressure control of the hydraulic control circuit 50, based on input signals from the various sensors. The ECU 40 outputs a command signal to each device installed as a control target in the vehicle 10. For example, in controlling each engagement device of the automatic transmission 22 as the hydraulic-pressure control of the hydraulic control circuit 50, the ECU 40 outputs to the hydraulic control circuit 50 a hydraulic-pressure command signal for controlling an operating state of the engagement device. The hydraulic-pressure command signal is a command signal for driving each of the solenoid valves SL1 to SL6 that respectively adjust hydraulic pressures to be supplied to hydraulic actuators of the engagement devices.

The ECU 40 is also configured to implement downshift control by predicting a future traveling state on traveling, as the shift control of the automatic transmission 22. For example, if the ECU 40 is capable of predicting that the brake pedal is depressed in the future on traveling of the vehicle 10, the ECU 40 implements control (downshift control) of commencing a downshift before detecting a brake operation by the driver to generate a deceleration by an engine brake. In other words, the ECU 40 implements prediction control of predicting a future traveling state on traveling. The ECU 40 grasps in advance a necessity of a downshift with deceleration, in accordance with a result of prediction. The ECU 40 also increases the deceleration by the engine brake, by a downshift to a lower shift position on traveling in an accelerator-off state.

Figure 2:
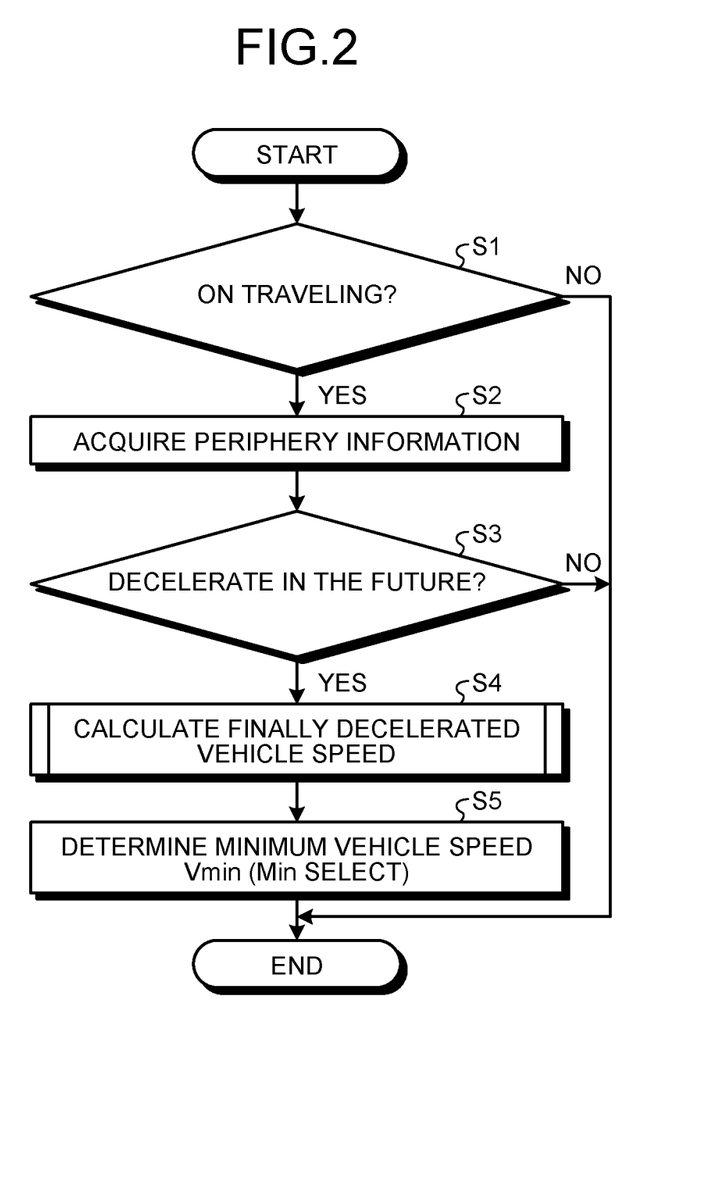
FIG. 2 is a flowchart illustrating a minimum vehicle speed calculation control flow.

FIG. 2 is a flowchart illustrating a prediction control flow. The control illustrated in FIG. 2 is repeatedly implemented by the ECU 40.

The ECU 40 determines whether the vehicle 10 is on traveling (step S1). In step S1, the ECU 40 determines whether the vehicle 10 stops, based on a vehicle speed detected by the vehicle speed sensor 41. When the vehicle 10 stops (step S1: No), this control routine ends.

When the vehicle 10 is on traveling (step S1: Yes), the ECU 40 acquires periphery information (step S2). The periphery information is information on a periphery of the vehicle 10. The periphery information contains information on a preceding vehicle traveling forward of an own vehicle (forward vehicle information), map information obtained from a navigation system 60, information on a traffic light located forward of the own vehicle (traffic light information) and the like.

The ECU 40 includes an information acquisition unit that acquires periphery information. The information acquisition unit acquires map information from the navigation system 60. The map information contains a curvature R of a corner on a planned route, a gradient of a road, a coefficient of friction on a road surface (i.e., a road surface μ) and the like. The information acquisition unit also acquires forward vehicle information through, for example, communications between the preceding vehicle and the own vehicle. The forward vehicle information contains an inter-vehicle distance from the own vehicle to the preceding vehicle, a relative vehicle speed of the own vehicle to the preceding vehicle and the like. The information acquisition unit also acquires traffic light information on a traffic light forward of the own vehicle, based on infrastructure information to be sent from a traffic infrastructure (roadside infrastructure apparatus) to the vehicle 10. The traffic light information contains a time elapsed until a signal changes, a distance from the own vehicle to the traffic light and the like. The ECU 40 is capable of grasping traveling environments and situations around the vehicle 10, based on periphery information acquired by the information acquisition unit.

When step S2 is carried out, the ECU 40 determines whether the vehicle 10 on traveling decelerates in the future, using the periphery information (step S3). When the ECU 40 is incapable of predicting future deceleration (step S3: No), this control routine ends.

The ECU 40 includes a deceleration prediction unit that predicts that the vehicle 10 on traveling will decelerate in the future. The presence or absence of deceleration is the presence or absence of a deceleration request owing to the brake operation by the driver. In other words, the deceleration prediction unit predicts whether a deceleration (brake deceleration) obtained by applying a wheel brake in accordance with a deceleration request is required in addition to a deceleration by an engine brake. The deceleration prediction unit also predicts the presence or absence of deceleration, using the periphery information. For example, the deceleration prediction unit calculates a vehicle speed of the vehicle 10 capable of turning a corner with a curvature R, based on map information. The deceleration prediction unit then predicts whether a deceleration according to the brake operation is required for achieving this vehicle speed. This vehicle speed indicates a vehicle speed at a position immediately before entering the corner. The deceleration prediction unit also predicts whether deceleration is required in the future, based on the inter-vehicle distance and relative speed contained in the forward vehicle information. When the relative speed is higher than a predetermined speed, the deceleration prediction unit predicts that the deceleration is required in the future. The deceleration prediction unit also predicts whether the traffic light forward of the own vehicle turns on a red signal at the time when the own vehicle arrives at the signal light, based on the traffic light information. The deceleration prediction unit predicts that the deceleration is required in the future on condition that the signal light turns on a red signal at the time when the own vehicle arrives at the signal light even if the signal light currently turns on a blue signal.

When the ECU 40 is capable of predicting that the vehicle 10 decelerates in the future (step S3: Yes), the ECU 40 calculates a finally decelerated vehicle speed that is a vehicle speed reaching after the deceleration (step S4).

The ECU 40 includes a minimum vehicle speed calculator that calculates a finally decelerated vehicle speed (minimum vehicle speed) of the vehicle 10. The finally decelerated vehicle speed is a vehicle speed after deceleration at a predetermined point forward of the vehicle 10 when the deceleration prediction unit predicts that the vehicle 10 decelerates in the future. The minimum vehicle speed calculator calculates the finally decelerated vehicle speed, using the periphery information. Specifically, the minimum vehicle speed calculator is capable of calculating the finally decelerated vehicle speed, using the map information, the finally decelerated vehicle speed, using the forward vehicle information, and the finally decelerated vehicle speed, using the traffic light information, independently of one another. These subroutines will be described later with reference to FIGS. 3 to 5.

The ECU 40 selects a minimum one of the finally decelerated vehicle speeds calculated in step S4 (Min select), and determines the finally decelerated vehicle speed as a minimum vehicle speed (step S5). When the ECU 40 calculates finally decelerated vehicle speeds, based on different kinds of information in the periphery information in step S4, the ECU 40 sets a relatively minimum one of the finally decelerated vehicle speeds as a minimum vehicle speed Vmin in step S5. When the ECU 40 calculates one finally decelerated vehicle speed in step S4, the ECU 40 automatically sets this finally decelerated vehicle speed as the minimum vehicle speed Vmin. When the ECU 40 sets the minimum vehicle speed Vmin in step S5, a storage unit of the ECU 40 stores therein minimum vehicle speed information.

For example, when there is a corner with a curvature R which the vehicle 10 is capable of successfully turning the corner at a vehicle speed of 50 km/h before entering the corner, it may be additionally assumed that there is a preceding vehicle on traveling at a vehicle speed of 30 km/h between the corner and the own vehicle. In this case, the vehicle speed of the preceding vehicle is relatively low. Therefore, the ECU 40 selects a finally decelerated vehicle speed of "30 km/h" that is calculated using the forward vehicle information, as the minimum vehicle speed in step S5. In step S5, a comparison with a finally decelerated vehicle speed calculated using map information is also possible in addition to the comparison between the two kinds of information. Also in step S5, when the ECU 40 selects the minimum vehicle speed, the ECU 40 sets a deceleration time corresponding to the selected minimum vehicle speed, as a deceleration time Tdec of a processing target (a predetermined time which will be described later). When step S5 is carried out, this control routine ends.

Figure 3:
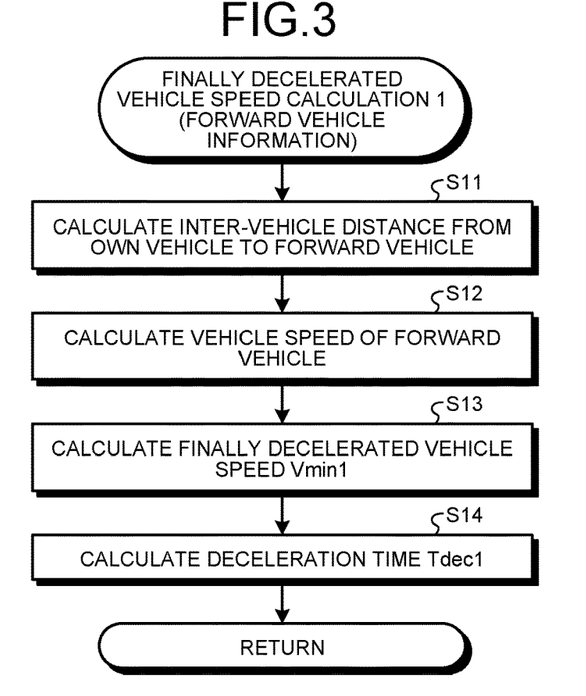
FIG. 3 is a flowchart illustrating a first subroutine of a calculation process in step S4 of FIG. 2.
Figure 4:
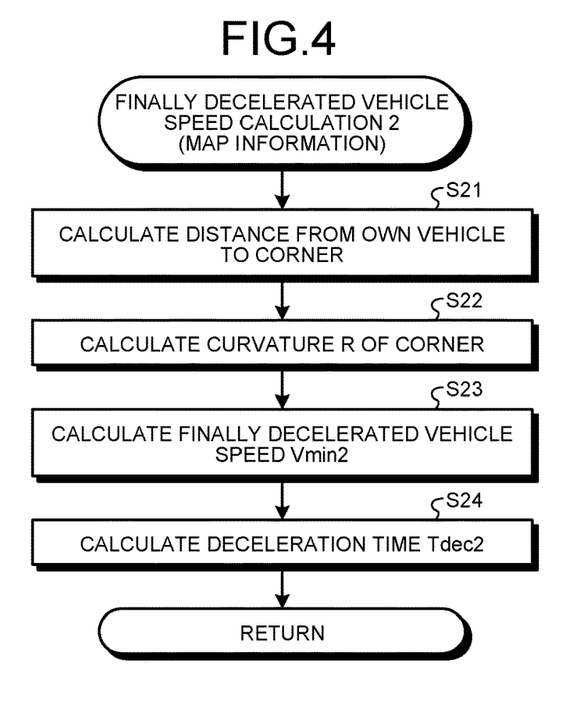
FIG. 4 is a flowchart illustrating a second subroutine of the calculation process in step S4 of FIG. 2.
Figure 5:
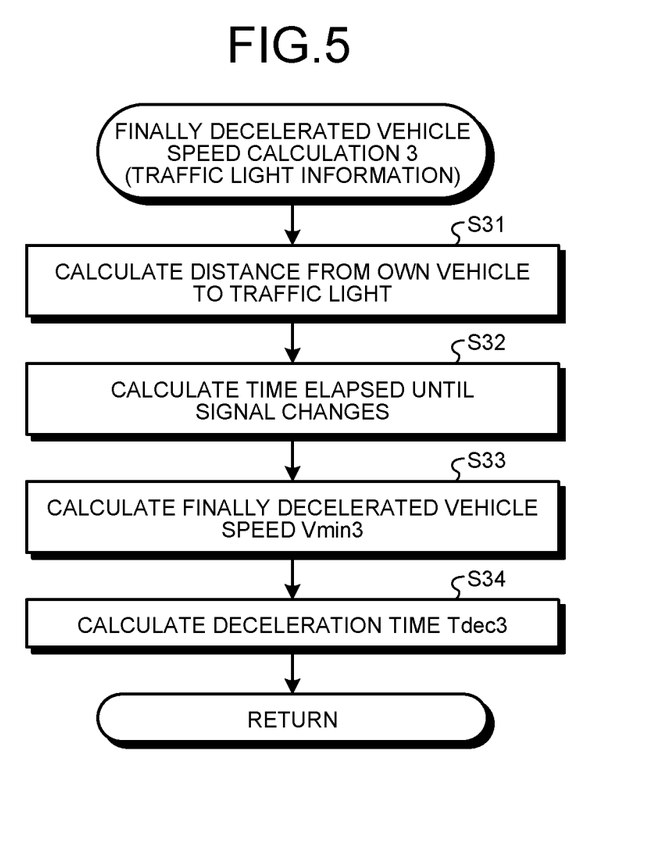
FIG. 5 is a flowchart illustrating a third subroutine of the calculation process in step S4 of FIG. 2.

With reference to FIGS. 3 to 5, next, a description will be given of the subroutines of the calculation process in step S4 described above. FIG. 3 illustrates a first subroutine using the forward vehicle information. FIG. 4 illustrates a second subroutine using the map information. FIG. 5 illustrates a third subroutine using the traffic light information.

As illustrated in FIG. 3, in the subroutine using the forward vehicle information, the ECU 40 calculates an inter-vehicle distance from the own vehicle to the preceding vehicle (forward vehicle) (step S11), and calculates a vehicle speed of the preceding vehicle (step S12). In steps S11 and S12, the ECU 40 calculates the inter-vehicle distance and the vehicle speed of the preceding vehicle by, for example, communications between the own vehicle and the preceding vehicle.

Next, the ECU 40 calculates a finally decelerated vehicle speed Vmin1 of the own vehicle, based on the vehicle speed of the preceding vehicle (step S13). In step S13, the vehicle speed of the preceding vehicle, the vehicle speed being calculated in step S12 may be set at the finally decelerated vehicle speed Vmin1.

Next, the ECU 40 calculates a deceleration time Tdec1 indicating a time elapsed until the current vehicle speed reaches the finally decelerated vehicle speed Vmin1 (step S14). In step S14, the ECU 40 may obtain the deceleration time Tdec1 by dividing the inter-vehicle distance calculated in step S11 by a relative vehicle speed of the current vehicle speed of the vehicle 10 to the finally decelerated vehicle speed Vmin1. When step S14 is carried out, this subroutine ends.

The ECU 40 includes a deceleration time calculator that calculates a required deceleration and a deceleration time, based on the difference between the current vehicle speed and the finally decelerated vehicle speed. The deceleration time calculator may calculate a deceleration time, using the forward vehicle information. The deceleration time calculator may also calculate a deceleration time, using the map information. The deceleration time calculator may also calculate a deceleration time, using the traffic light information.

As illustrated in FIG. 4, in the subroutine using the map information, the ECU 40 calculates a distance from the own vehicle to the corner forward of the own vehicle (step S21), and calculates a curvature R of the corner (step S22). The ECU 40 may identify the position of the own vehicle, using a global positioning system (GPS). In addition, the ECU 40 may also identify a position of a corner on a planned route and calculate a curvature R of the corner, based on the map information.

Next, the ECU 40 calculates a finally decelerated vehicle speed Vmin2, based on the curvature R of the corner (step S23). In step S23, the ECU 40 may set, at the finally decelerated vehicle speed Vmin2, a vehicle speed of the vehicle 10 at a position immediately before entering the corner with the curvature R, the vehicle 10 being capable of successfully turning the corner.

Next, the ECU 40 calculates a deceleration time Tdec2 indicating a time elapsed until the vehicle speed reaches the finally decelerated vehicle speed Vmin2 calculated in step S23 (step S24). In step S24, the ECU 40 may obtain the deceleration time Tdec2 by dividing the distance calculated in step S21 by a relative vehicle speed of the current vehicle speed of the vehicle 10 to the finally decelerated vehicle speed Vmin2. When step S24 is carried out, this subroutine ends.

As illustrated in FIG. 5, in the subroutine using the traffic light information, the ECU 40 calculates a distance from the own vehicle to the traffic light forward of the own vehicle (step S31), and calculates a time elapsed until the signal changes (step S32). In steps S31 and S32, the ECU 40 calculates the distance and the time, based on the infrastructure information sent from the traffic infrastructure.

Next, the ECU 40 calculates a finally decelerated vehicle speed Vmin3 at the time when the vehicle 10 arrives at the traffic light (step S33). In step S33, the ECU 40 sets at the finally decelerated vehicle speed Vmin3 a vehicle speed at the time when the vehicle 10 stops in front of the traffic light turning on a red signal, that is, a vehicle speed of 0 km/h.

Next, the ECU 40 calculates a deceleration time Tdec3 indicating a time elapsed until the vehicle 10 stops in front of the traffic light, based on the distance from the own vehicle to the traffic light, the distance being calculated in step S31, the time elapsed until the signal changes, the time being calculated in step S32, and the current vehicle speed (step S34). When step S34 is carried out, this subroutine ends.

As described above, when the ECU 40 executes all the subroutines illustrated in FIGS. 3 to 5, the ECU 40 calculates the finally decelerated vehicle speed Vmin1 based on the forward vehicle information, the finally decelerated vehicle speed Vmin2 based on the map information, and the finally decelerated vehicle speed Vmin3 based on the traffic light information, as candidates of the minimum vehicle speed Vmin. In step S5 of FIG. 2, the ECU 40 sets at the minimum vehicle speed Vmin a minimum one of the finally decelerated vehicle speeds Vmin1, Vmin2, and Vmin3. Also in step S5, the storage unit of the ECU 40 stores therein, as the deceleration time Tdec, the deceleration time corresponding to the finally decelerated vehicle speed selected as the minimum vehicle speed Vmin.

Figure 6:
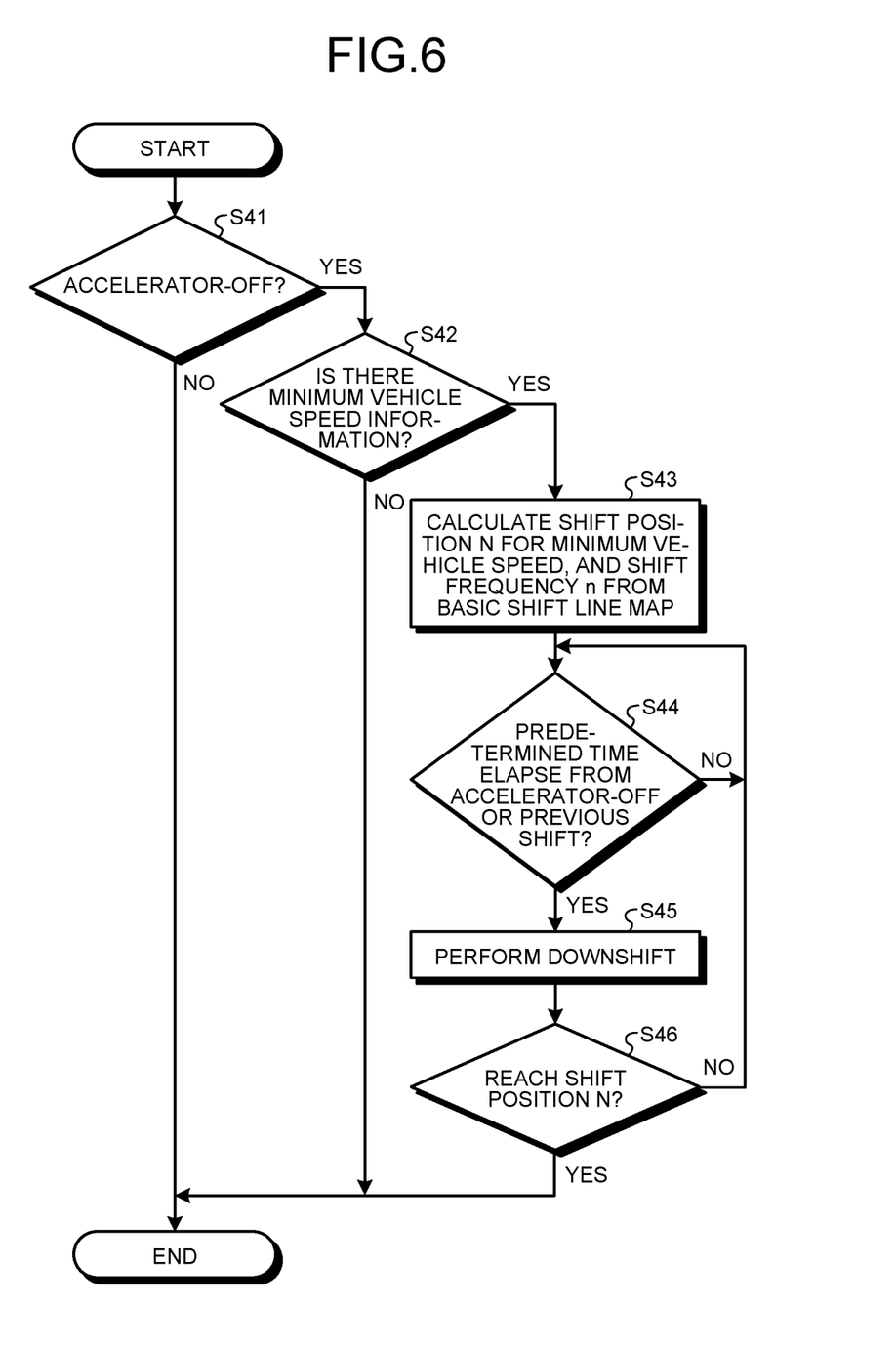
FIG. 6 is a flowchart illustrating a downshift control flow.

With reference to FIG. 6, next, a description will be given of downshift control. FIG. 6 is a flowchart illustrating the downshift control. The control illustrated in FIG. 6 is repeatedly implemented by the ECU 40 on traveling of the vehicle 10.

The ECU 40 determines whether the driver releases the accelerator pedal (step S41). In step S41, the ECU 40 determines whether the accelerator pedal opening sensor 45 detects accelerator-off. When the driver depresses the accelerator pedal (step S41: No), this control routine ends.

When the driver releases the accelerator pedal (step S41: Yes), the ECU 40 determines whether there is information on a minimum vehicle speed (step S42). In step S42, the ECU 40 determines whether the minimum vehicle speed Vmin is set by execution of the processing in steps S4 and S5 of FIG. 2. When there is no information on a minimum vehicle speed (step S42: No), this control routine ends. The case where the negative determination is made in step S42 refers to a case where a negative determination is made in step S3 of FIG. 2.

When there is the information on the minimum vehicle speed (step S42: Yes), the ECU 40 determines a shift position N for the minimum vehicle speed Vmin, and calculates a shift frequency n for the shift position N, based on a basic shift line map (step S43). In step S43, the ECU 40 determines, as a target shift position (shift position N), a shift position for the minimum vehicle speed Vmin set in step S5 at the time when the accelerator pedal opening is fully closed (0%) on the basic shift line map (see FIG. 7). In other words, the ECU 40 sets a shift position in an accelerator-off state. The shift frequency n is the number of downshifts from the current shift position to the target shift position. For example, when the current shift position is the fifth gear step, and the shift position N is the second gear step, the shift frequency n is calculated as "three".

Figure 7:
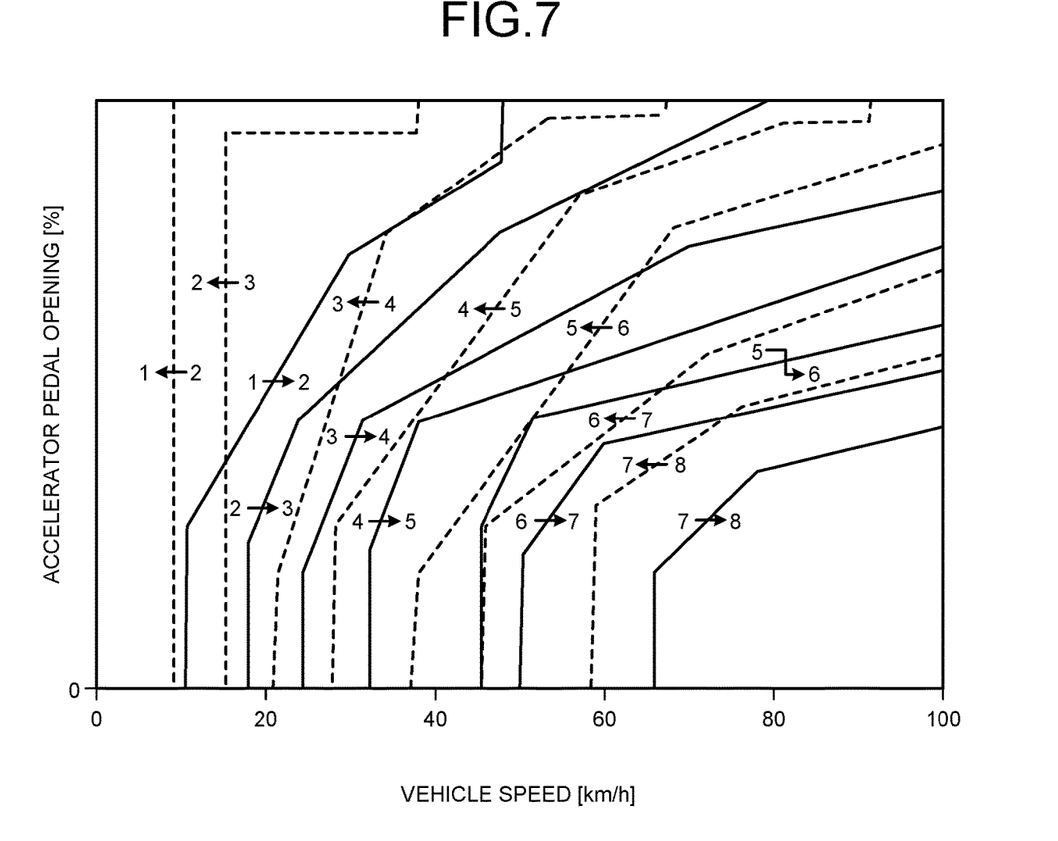
FIG. 7 illustrates an example of shift line map.

The ECU 40 includes a target shift position determination unit that determines a shift position N (target shift position) for a finally decelerated vehicle speed, based on the finally decelerated vehicle speed and the shift line map. As illustrated in FIG. 7, the shift line map is a map defined based on an accelerator pedal opening and a vehicle speed. This shift line map is previously stored in the storage unit of the ECU 40. In addition, the shift line map illustrated in FIG. 7 is a basic shift line map having shift lines (upshift lines, downshift lines) corresponding to the automatic transmission 22 that establishes the eight forward gear steps, that is, the first to eighth gear steps. In FIG. 7, each of the upshift lines is indicated by a solid line, and each of the downshift lines is indicated by a broken line.

The ECU 40 determines whether a predetermined time elapses from the accelerator-off or the previous shift timing (step S44). This predetermined time is a time width calculated based on the deceleration time Tdec and the shift frequency n. A value to be obtained by dividing "the deceleration time Tdec" by "the shift frequency n+1" may be set at the predetermined time for use in step S44. For example, when the shift frequency is "three", a time width obtained by equally dividing the deceleration time Tdec into four is set at the predetermined time. In addition, the predetermined time is controlled such that the predetermined time does not become short so as to cause a busy shift, that is, such that the predetermined time does not become equal to or less than a predetermined value. The deceleration time Tdec is the deceleration time previously set as a processing target in step S5 of FIG. 2.

In step S44, in the case where the ECU 40 determines whether the predetermined time elapses from the accelerator-off, the ECU 40 determines whether a time after a lapse of the predetermined time is timing of performing an initial shift (shift timing). Also in step S44, in the case where the ECU 40 determines whether the predetermined time elapses from the previous downshift, the ECU 40 determines whether a time after a lapse of the predetermined time is shift timing of performing a second downshift and downshifts subsequent to the second downshift. By carrying out step S44, shift timing is provided at regular intervals within the deceleration time Tdec.

When the predetermined time does not elapse from the accelerator-off or when the predetermined time does not elapse from the previous shift (step S44: No), step S44 is repeatedly carried out.

When the predetermined time elapses from the accelerator-off or when the predetermined time elapses from the previous shift (step S44: Yes), the ECU 40 performs a downshift (step S45). In step S45, the ECU 40 performs a downshift to lower a shift position by one.

The ECU 40 includes a downshift controller that performs a downshift from a current shift position to a shift position for a finally decelerated vehicle speed (i.e., a target shift position) one by one. In performing multiple downshifts within a deceleration time, the downshift controller performs the downshifts at regular time intervals.

Next, the ECU 40 determines whether the shift position reaches a shift position N that is a target shift position (step S46). When the shift position does not reach the shift position N (step S46: No), this control routine returns to step S44. When the shift position reaches the shift position N (step S46: Yes), this control routine ends.

Figure 8:
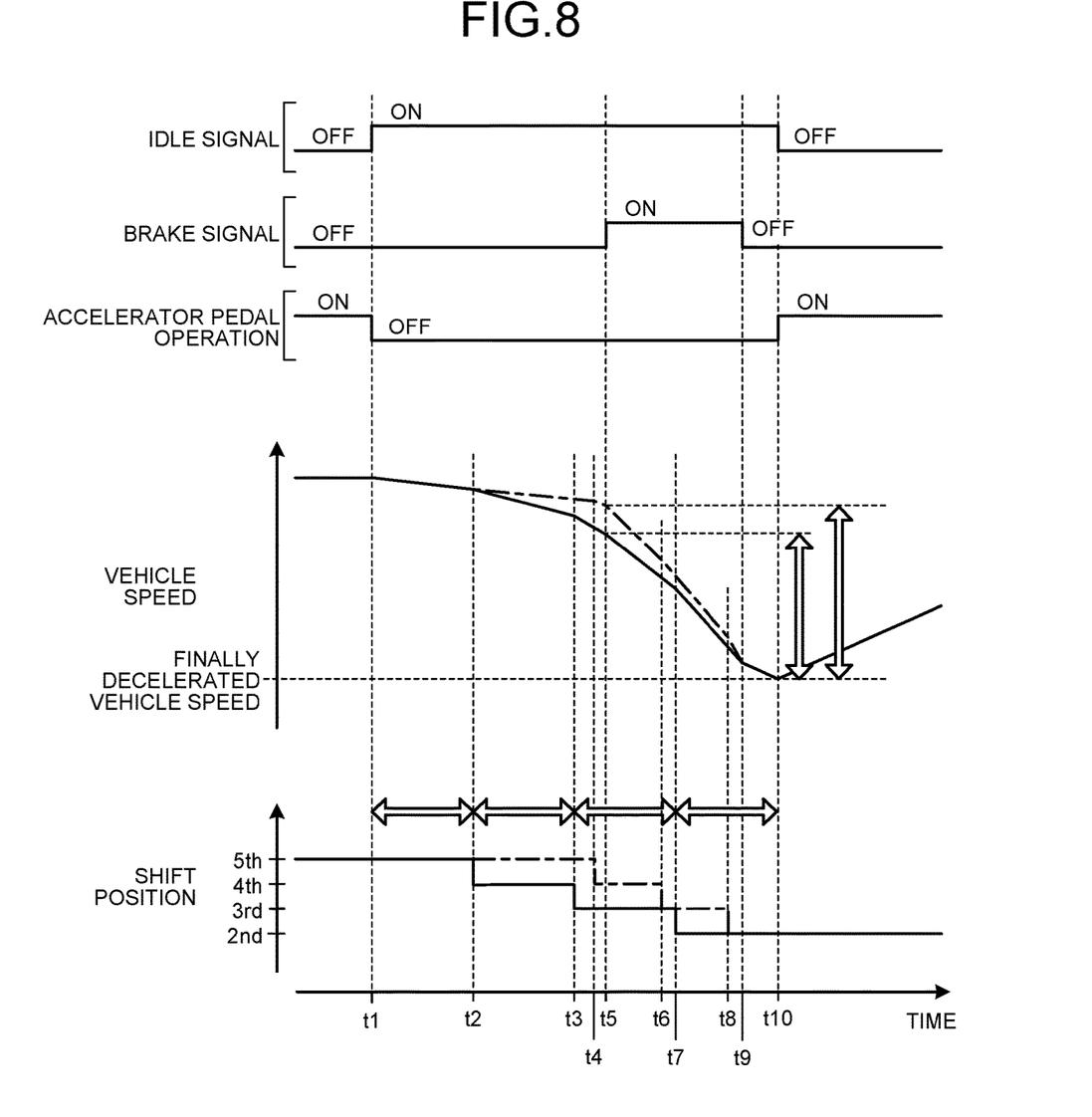
FIG. 8 is a time chart illustrating a change in vehicle state in implementing downshift control.

FIG. 8 is a time chart illustrating a change in vehicle state in implementing the downshift control. FIG. 8 illustrates a state in which the vehicle 10 that travels at a constant vehicle speed implements the downshift control, and then accelerates again. In FIG. 8, a sold line indicates a case where the downshift control according to the embodiment is implemented, and a one-dot chain line indicates a case where the downshift control according to the embodiment is not applied, for comparison.

In the state in which the vehicle 10 travels at a constant vehicle speed, first, the driver depresses the accelerator pedal, and the shift position is changed to the fifth gear step (5th). From this state, the accelerator pedal is released (time t1). At the time t1, the ECU 40 detects a switch from ON to OFF as to an accelerator pedal operation, and an idle signal indicating an accelerator-off state is turned on.

At the time t1, the ECU 40 calculates a finally decelerated vehicle speed in the accelerator-off state, and determines a target shift position that is a shift position for the finally decelerated vehicle speed. In the example illustrated in FIG. 8, the target shift position is set at the second gear step (2nd). Also at the time t1, the ECU 40 commences downshift control from the fifth gear step (5th) that is the current shift position to the second gear step (2nd) that is the target shift position. In this case, as to a time elapsed until the current vehicle speed reaches the finally decelerated vehicle speed, the ECU 40 calculates "a time width from the time t1 to a time t10" as "a deceleration time Tdec". The ECU 40 performs downshifts "three" times from the fifth gear step to the second gear step. Therefore, the ECU 40 performs the downshifts at intervals obtained by equally dividing "the time width from the time t1 to the time t10" into "3+1". Each interval corresponds to a time width obtained by dividing "the deceleration time Tdec" by "the shift frequency n+1". The time width divided into four is defined as the predetermined time.

After a lapse of the predetermined time from the time t1, the ECU 40 performs the downshift from the fifth gear step (5th) to the fourth gear step (4th) (time t2). The time t2 is a point in time at which the predetermined time elapses from the accelerator-off, and therefore corresponds to first shift timing. In other words, the ECU 40 does not perform a downshift on condition that an operating point (accelerator pedal opening, vehicle speed) of the shift line map exceeds the downshift line owing to deceleration, but performs a downshift on condition that the predetermined time elapses based on the deceleration time at the time t2.

When the predetermined time elapses from the time t2, the ECU 40 performs the downshift from the fourth gear step (4th) to the third gear step (3rd) (time t3). The time t3 is a point in time at which the predetermined time elapses from the previous downshift, and therefore corresponds to second shift timing. As indicated by the one-dot chain line, in the case where the embodiment is not applied, the downshift from the fifth gear step (5th) to the fourth gear step (4th) is performed after the time t3 (time t4). The conventional downshift at the time t4 is performed since an operating point of the shift line map exceeds a downshift line (5th to 4th).

After the time t3, the ECU 40 detects depression of the brake pedal by the driver in the accelerator-off state (time t5). At the time t5, the ECU 40 brings about a transition from a deceleration state of only an engine brake at the third gear step (3rd) to a deceleration state of a braking force (brake deceleration) generated owing to a brake pedal operation. As indicated by the one-dot chain line, in the case where the embodiment is not applied, the downshift from the fourth gear step (4th) to the third gear step (3rd) is performed after the time t5 (time t6). The conventional downshift at the time t6 is performed since an operating point of the shift line map exceeds a downshift line (4th to 3rd).

After the time t5, the ECU 40 performs the downshift from the third gear step (3rd) to the second gear step (2nd) with the brake pedal depressed (time t7). The time t7 is a point in time at which the predetermined time elapses from the previous downshift, and therefore corresponds to third shift timing. In the case where the embodiment is not applied, the downshift from the third gear step (3rd) to the second gear step (2nd) is performed after the time t7 (time t8). The conventional downshift at the time t8 is performed since an operating point of the shift line map exceeds a downshift line (3rd to 2nd).

After the time t7, the depression of the brake pedal by the driver is released in the state of the second gear step (2nd) (time t9). At the time t9, a brake signal is turned off.

After the time t9, the vehicle speed reaches the finally decelerated vehicle speed with neither the accelerator pedal nor the brake pedal depressed (time t10). At the time t10, since the ECU 40 detects depression of the accelerator pedal by the driver, the vehicle 10 accelerates again. At the time t10, the downshift control by the ECU 40 ends.

As described above, the ECU 40 implements the downshift control to provide the shift timing at regular intervals, based on the target shift position and the deceleration time. This configuration enables commencement of a downshift before brake-on, which suppresses occurrence of a so-called busy shift. According to the embodiment, the positive use of an engine brake enables reduction in vehicle speed before brake-on, enables suppression in work (deceleration) by the brake, and enables increase in service lifetime of a brake pad. In the case where the embodiment is not applied, there is a possibility that a shift (downshift) to a target shift position is not performed yet depending on a shift time (deceleration time) at the time when the driver issues a request of reacceleration (i.e., at the time of accelerator-on). Conventionally, a downshift is performed before a brake signal is turned on in some instances. However, this is merely a shift to be performed since an operating point exceeds a downshift line of a shift line map, based on a reduction in vehicle speed. Therefore, this is technically different from the downshift to the target shift position determined based on the attained deceleration vehicle speed (minimum vehicle speed Vmin) in the embodiment.

As described above, according to the embodiment, in the case where the ECU 40 predicts deceleration on traveling, when the accelerator pedal is released, the ECU 40 commences a downshift before detecting brake-on. This configuration therefore satisfactorily ensures a shift time until a target shift position is established. In addition, the ECU 40 performs multiple downshifts at regular intervals, and controls the intervals such that each interval does not become smaller than a predetermined value. This configuration thus suppresses occurrence of a busy shift in performing the multiple downshifts.

The ECU 40 decelerates the vehicle 10 by a downshift before the brake operation or before occurrence of deceleration by the brake. This configuration therefore enables improvement in service lifetime of the brake pad against wear.

It should be noted that the foregoing embodiment may be modified as follows. For example, the automatic transmission 22 is not limited to a stepped automatic transmission, but may be a continuously variable transmission (CVT) including a pair of pulleys. When the automatic transmission 22 is a continuously variable transmission, controlling a groove width of a primary pulley and a groove width of a secondary pulley enables a stepwise change in change gear ratio of the continuously variable transmission like a plurality of shift positions. Therefore, even when the automatic transmission 22 is a continuously variable transmission including a pair of pulleys and a belt wound between the pulleys, the ECU 40 is capable of implementing shift control of establishing a plurality of shift positions, based on a shift line map having shift lines. When the automatic transmission 22 is the continuously variable transmission, the primary pulley is disposed coaxially with the transmission input shaft 32; however, the secondary pulley and the output gear 24 are not disposed coaxially with the transmission input shaft 32. As described above, since the automatic transmission 22 may be either a stepped automatic transmission (AT) or a continuously variable transmission (CVT), the gear step described above may be read as a shift position.

A method of calculating the predetermined time in step S44 of FIG. 6 is not limited to the foregoing method of dividing "the deceleration time Tdec" by "the shift frequency n+1". For example, "the deceleration time Tdec" may be divided by "the number of shift positions to be established from a current shift position to a target shift position". For example, when the current shift position is the fifth gear step, and the target shift position is the second gear step, four shift positions, that is, the fifth gear step, the fourth gear step, the third gear step, and the second gear step are established. In this case, the predetermined time may be set using a time width obtained by dividing "the deceleration time Tdec" by four which is the number of shift positions to be established, that is, by dividing "the deceleration time Tdec" into four. In addition, the predetermined time is controlled so as not to become equal to or less than the predetermined value for the purpose of suppressing occurrence of a busy shift. In other words, the ECU 40 sets the predetermined time having a value larger than a certain predetermined value.

In using the map information as illustrated in FIG. 4, the finally decelerated vehicle speed Vmin2 may be corrected using information such as a gradient and a road surface μ. In addition, the deceleration time Tdec2 may be corrected in accordance with the correction of the finally decelerated vehicle speed Vmin2. For example, when the vehicle 10 travels a downhill corner with a large gradient, the ECU 40 corrects the finally decelerated vehicle speed Vmin2 to be low and also corrects the deceleration time Tdec to be long such that the vehicle 10 successfully turns the corner. When a road surface μ is low due to, for example, rain, the ECU 40 corrects the finally decelerated vehicle speed Vmin2 to be low and also corrects the deceleration time Tdec to be long such that the vehicle 10 successfully turns the corner.

Alternatively, the ECU 40 may correct a finally decelerated vehicle speed depending on a driver selector mode such as a sports mode. For example, in the sports mode, the ECU 40 corrects a finally decelerated vehicle speed (minimum vehicle speed) to be higher than that in a mode different from the sports mode.

Figure 9:
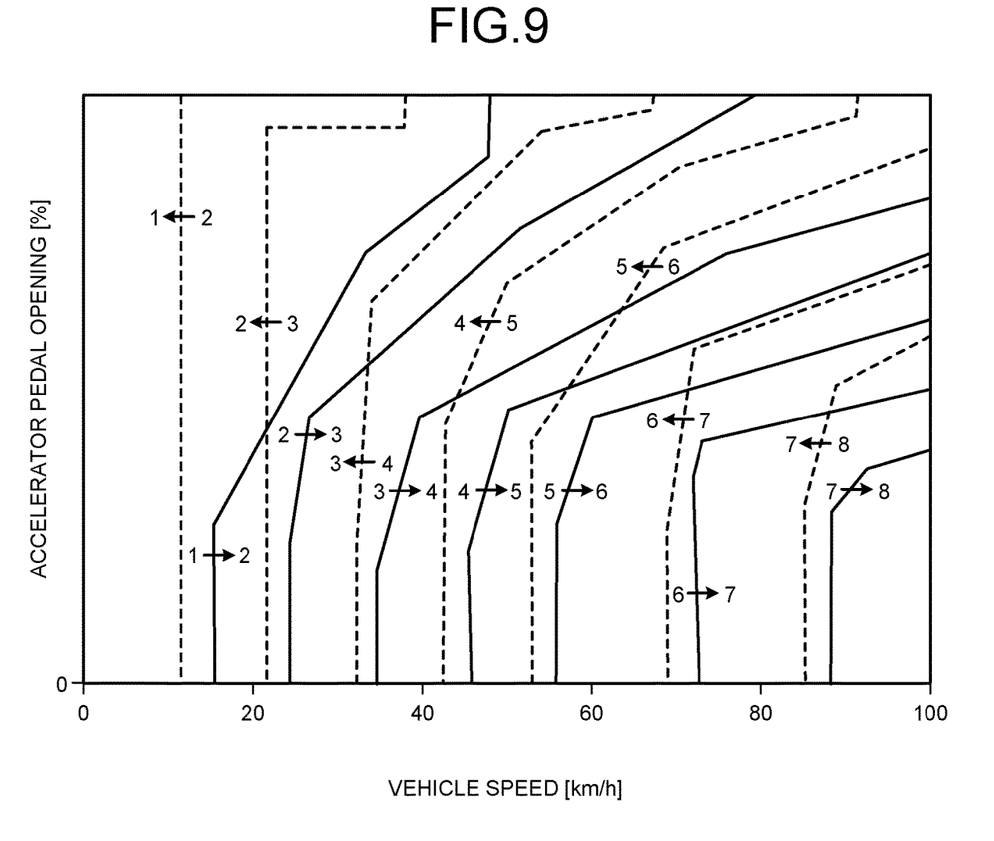
FIG. 9 illustrates another example of shift line map.

Alternatively, the ECU 40 may switch a shift line map depending on a driver selector mode (driver operation) such as a sports mode. In this case, the storage unit of the ECU 40 stores therein a plurality of shift line maps. Examples of the shift line map may include a basic shift line map to which the ECU 40 refers in basic shift control, a shift line map for a sports mode to which the ECU 40 refers in selecting a sports mode, a shift line map for a brake switched between ON and OFF of a brake operation and the like. FIG. 9 illustrates an example of shift line map for use in the sports mode. As illustrated in FIG. 9, the shift line map for the sports mode has an enlarged region in which a lower gear step is used, as compared with the basic shift line map illustrated in FIG. 7. In other words, in an accelerator-off state, the region where a lower gear step is used is enlarged toward a higher vehicle speed side. As described above, the ECU 40 automatically switches a shift line map when the ECU 40 has a shift line map according to a driver operation in, for example, the sports mode, in addition to a basic shift line map.

Figure 10:
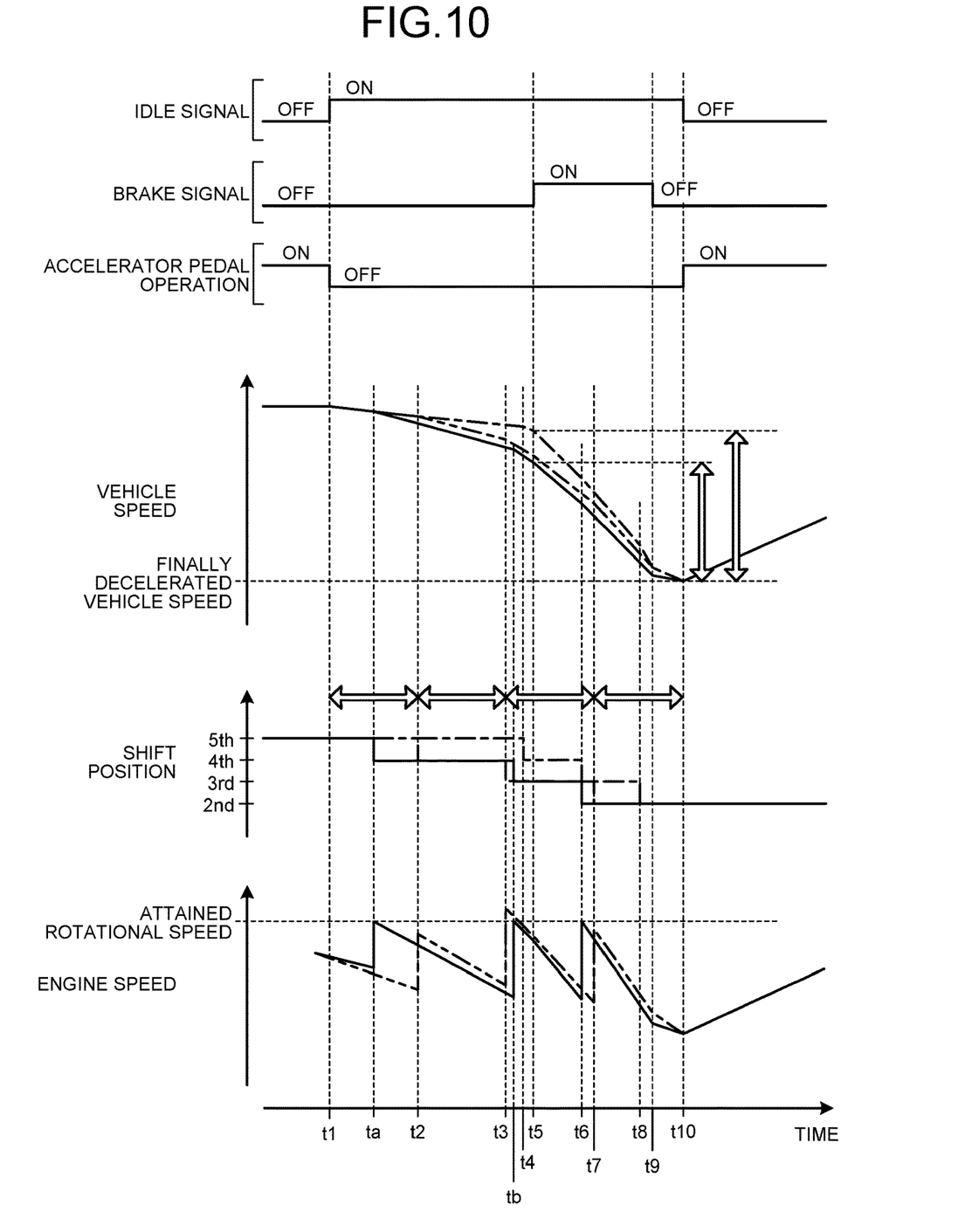
FIG. 10 is a time chart illustrating a change in vehicle state in performing downshifts such that engine speeds after the respective shifts become equal to one another.

The ECU 40 does not necessarily implement the downshift control such that the shift timing is provided at the regular intervals. Alternatively, the ECU 40 may implement downshift control such that the rotational speeds of the engine 12 (i.e., engine speeds) after the respective downshifts become equal to one another. FIG. 10 illustrates an example case of implementing the downshift control according to the modification. In FIG. 10, a one-dot chain line indicates a change in vehicle state in a case where the embodiment is not applied. Also in FIG. 10, a chain double-dashed line indicates a change in vehicle state in a case where the embodiment is applied so that the shift timing is provided at the regular intervals as described above. Also in FIG. 10, a solid line indicates a change in vehicle state in a case where the modification is applied.

As illustrated in FIG. 10, the ECU 40 according to the modification performs the downshifts such that engine speeds (attained rotational speeds) to be attained after the respective downshifts become equal to one another. Each of the attained rotational speeds is a rotational speed to be set by the ECU 40. For example, each of the attained rotational speeds is set at 4000 revolutions. The ECU 40 determines the attained rotational speeds, based on an target shift position and a deceleration time. In this modification, the ECU 40 performs the downshift from the fifth gear step (5th) to the fourth gear step (4th) at a time ta, in accordance with an engine speed indicated by the solid line. In other words, the ECU 40 determines timing of performing a downshift, based on an engine speed. After the time ta, the ECU 40 performs the downshift from the fourth gear step (4th) to the third gear step (3rd) at a time tb. After the time tb, the ECU 40 performs the downshift from the third gear step (3rd) to the second gear step (2nd) at a time t6. According to this modification, the ECU 40 performs the multiple downshifts, based on the engine speeds, such that the attained rotational speeds after the respective downshifts become equal to one another. The shift timing thus becomes earlier than conventional shift timing. This configuration therefore ensures a satisfactory shift time, and suppresses occurrence of a busy shift. This configuration also suppresses variations in shift timing interval. This configuration also suppresses fluctuations in engine speed per unit time. The control of performing downshifts such that attained rotational speeds become equal to one another as described in the modification may be referred to as second control. The control of performing downshifts such that shift timing is provided at regular intervals as described in the embodiment may be referred to as first control.

According to an embodiment, the shift control device commences a downshift from a current shift position to a target shift position before detection of a brake operation. The shift control device therefore satisfactorily ensures a time for multiple downshifts. In this state, the shift control device provides shift timing at regular intervals with such a time width that each interval does not become equal to or less than a predetermined value. The shift control device thus suppresses occurrence of a busy shift. In addition, the shift control device performs multiple downshifts such that the rotational speeds of the engine after the respective downshifts become equal to one another, thereby suppressing variations in interval of shift timing. The shift control device thus suppresses occurrence of a busy shift.

According to an embodiment, the shift control device performs multiple downshifts so as to provide shift timing at regular intervals. With this configuration, the shift control device suppresses occurrence of a busy shift.

According to an embodiment, when the vehicle needs to decelerate in the future, the shift control device sets an appropriate minimum vehicle speed, based on periphery information. With this configuration, the shift control device implements downshift control according to a driver's intention.

According to an embodiment, a deceleration is ensured by an engine brake, which leads to reduction in work of a brake and increase in service lifetime of the brake.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A shift control device for a vehicle including an engine and an automatic transmission,
   the shift control device comprising:
   a minimum vehicle speed calculator configured to, when it is determined that a vehicle on traveling needs to decelerate before the vehicle arrives at a forward predetermined point based on periphery information, which is information on a periphery of the vehicle, calculate a minimum vehicle speed, which is a vehicle speed after the deceleration, using the periphery information;
   a shift position determination unit configured to determine a target shift position, which is a shift position to be attained after the deceleration in accordance with the minimum vehicle speed; and
   a downshift controller configured to, when the minimum vehicle speed is calculated, commence a downshift from a current shift position to the target shift position before a detection of an operation of depressing a brake pedal by a driver, wherein
   the downshift controller is configured to implement first control of performing multiple downshifts from the current shift position to the target shift position such that shift timing is provided at regular intervals, or second control of performing multiple downshifts such that rotational speeds of the engine after the respective downshifts become equal to each other, and
   each interval of the downshift is set so as not to become equal to or less than a predetermined value.

2. The shift control device for the vehicle according to claim 1, further comprising:
   a deceleration time calculator configured to calculate a deceleration time elapsed until the current vehicle speed reaches the minimum vehicle speed, wherein
   the shift position determination unit is configured to calculate a number of downshifts performed until the current shift position reaches the target shift position, and
   the downshift controller is configured to determine the shift timing such that the shift timing is provided at the regular intervals, based on the deceleration time and the number of downshifts.

3. The shift control device for the vehicle according to claim 1, wherein
   the periphery information includes: forward vehicle information, which is information on a preceding vehicle traveling forward of an own vehicle; and map information, which is obtained from a navigation system,
   the minimum vehicle speed calculator includes:
   a first calculator configured to, when the own vehicle follows the preceding vehicle, calculate a vehicle speed of the preceding vehicle, using the forward vehicle information, and calculate the minimum vehicle speed based on the calculated vehicle speed of the preceding vehicle;
   a second calculator configured to, when it is determined, using the map information, that the predetermined point is a corner, calculate a vehicle speed of the vehicle capable of traveling the corner based on a curvature of the corner, and calculate the minimum vehicle speed based on the calculated vehicle speed of the vehicle capable of traveling the corner; and
   a selector configured to select a minimum one of the minimum vehicle speed calculated by the first calculator and the minimum vehicle speed calculated by the second calculator, and
   the shift position determination unit is configured to determine the target shift position based on the minimum vehicle speed selected by the selector.

4. The shift control device for the vehicle according to claim 1, wherein
   the shift position determination unit is configured to determine, based on a shift line map defined by an accelerator pedal opening indicating an accelerator pedal depression amount and a vehicle speed, a shift position that achieves the minimum vehicle speed when the accelerator pedal opening is fully closed, as the target shift position, and
   the downshift controller is configured to commence the downshift from the current shift position to the target shift position in a state in which the driver releases the accelerator pedal.

* * * * *